United States Patent [19]

Roos et al.

[11] Patent Number: 4,971,298

[45] Date of Patent: Nov. 20, 1990

[54] HYDRAULIC ENGINE MOUNT

[75] Inventors: Jürgen Roos, Trebur; Wilhelm Konrad, Wörrstadt, both of Fed. Rep. of Germany

[73] Assignee: General Motors Corporation, Detroit, Mich.

[21] Appl. No.: 421,588

[22] Filed: Oct. 12, 1989

[30] Foreign Application Priority Data

Oct. 11, 1988 [DE] Fed. Rep. of Germany ....... 3834585

[51] Int. Cl.$^5$ ............................................... F16F 5/00
[52] U.S. Cl. ................................. 267/140.1; 267/219
[58] Field of Search ............... 248/562; 267/140.1 A, 267/140.1 C, 140.1 R, 121, 122, 123, 219

[56] References Cited

FOREIGN PATENT DOCUMENTS 3616043 1/1988 Fed. Rep. of Germany .
2132311 7/1984 United Kingdom ............. 267/140.1

Primary Examiner—Duane A. Reger
Attorney, Agent, or Firm—Ronald L. Phillips

[57] ABSTRACT

An engine mount has two support members which are interconnected by an elastomer element. The elastomer element is surrounded on its outer side by an annular chamber that forms a first hydraulic chamber to effect hydraulic damping of the engine mount. A second hydraulic chamber is provided inside the elastomer element. And the hydraulic chambers are in fluid communication with one another via throttle passages and an annular passage.

11 Claims, 1 Drawing Sheet

HYDRAULIC ENGINE MOUNT

TECHNICAL FIELD

The invention relates to an engine mount having opposed upper and lower support members which are interconnected only by an elastomer element, and a hydraulic damping device with an annular first hydraulic chamber which extends around the engine mount. The annular first hydraulic chamber is bounded outwardly by an atmospherically biased elastic diaphragm so as to be volumetrically displaceable, and is in communication via throttle passages with a second hydraulic chamber.

BACKGROUND OF THE INVENTION

An engine mount of the above type is disclosed in the German Offenlegunggschrift DE-OS 36 16 043. In this prior art engine mount, both chambers are arranged annularly around the engine mount. Because of this arrangement, the volume of the two hydraulic chambers that can be accommodated is relatively small, and as a result, the hydraulic damping capacity of the engine mount is relatively limited.

In an engine mount with satisfactory hydraulic damping characteristics, the volume of at least one hydraulic chamber must be relatively large, and the hydraulic damping device is therefore usually placed below the actual engine mount. However, this requires the use of large volume engine mounts which, because of space considerations, are not suitable for installation in modern-day motor vehicles.

SUMMARY OF THE INVENTION

It is an object of the present invention to provide an engine mount of the type described above which has a hydraulic damping device with a large hydraulic volume but which, nevertheless, is relatively small in overall size. This object is accomplished in accordance with the invention by arranging the second hydraulic chamber inside the area enclosed by the first hydraulic chamber, bounding same at least on one side by the elastomer element, and providing an annular passage outside of the elastomer element that is in hydraulic communication, via the throttling passages, with the two hydraulic chambers.

As a result, the two hydraulic chambers, rather than being fitted one behind the other in the load-bearing direction of the engine mount, are nested inside each other and arranged on the same plane. This enables the over-all volume of the hydraulic chambers to be kept relatively large while maintaining the overall dimensions of the engine mount at a minimum. Moreover, the annular passage according to the invention enables optimum flow of the hydraulic fluid between the two hydraulic chambers.

In accordance with one advantageous embodiment, the elastomer element has a frusto-conical configuration so that the second hydraulic chamber is simply located within the engine mount below the elastomer element.

The first hydraulic chamber which, upon compression of the engine mount, increases in hydraulic volume from the inner hydraulic chamber, is very simple in construction by being located on the outside of the outer cup-shaped body and then having the diaphragm, which defines the volume of the hydraulic chamber, fitted to this cup-shaped body.

Moreover, the elastic diaphragm is allowed to move into an equalizing chamber shielded against mechanical damage by having the elastic diaphragm form the boundary of an annular equalizing chamber adjacent to the equalizing chamber, placing the latter in communication with the atmosphere and enclosing the first hydraulic chamber.

A further feature is the damping of structure borne sound by disposing between the two cup-shaped bodies an annular diaphragm that is bounded on one side by the first hydraulic chamber and on the other side by the second hydraulic chamber.

The effectiveness of damping acoustic oscillations is even further improved by fitting the annular diaphragm, while allowing for axial play, in an annular chamber between the cup-shaped bodies so as to be able to sealingly engage the one or other cup-shaped body, depending on the biasing direction.

The damping characteristics of the engine mount are also tailored to varying requirements by the employment of an annular diaphragm in which the response characteristic is graduated. This is accomplished by providing the annular diaphragm with individual, dissimilar ring segments. And to limit the maximum spring travel of the engine mount, the elastomer element is provided with a stop that extends inwardly into the dish-shaped area of the elastomer element.

The extent of the outward deflection is controlled by relatively simple means so as to prevent the elastomer element from being subjected to undue stresses. This is accomplished with a dish-shaped disk that is fitted in the second hydraulic chamber and is adapted for movement inside the hydraulic chamber into abutment against the elastomer element as the upper and lower end portions are being pulled apart. This disk is also effective in damping the vibrations that occur in the acoustic range so that a lower dynamic spring rate is realized.

The disk is secured in the engine mount in a relatively simple manner by means of an element that also serves as a stop for the inward deflections of the mount. This is accomplished in accordance with another advantageous feature by means of a threaded nut that engages on one side with a shoulder provided on the side of the respective support member adjacent to the hydraulic chamber and engages on the opposite side facing the lower end portion with a stop.

If it is desired that the rigidity of the engine mount be different in different radial direction, it is proposed that the configuration of the engine mount be oval.

It should be appreciated that a variety of arrangements may be utilized in the practice of the invention. To convey the concept of the invention, two exemplary embodiments are illustrated in the drawings and described in the following specifications.

DETAILED DESCRIPTION OF THE INVENTION

Figure 1:
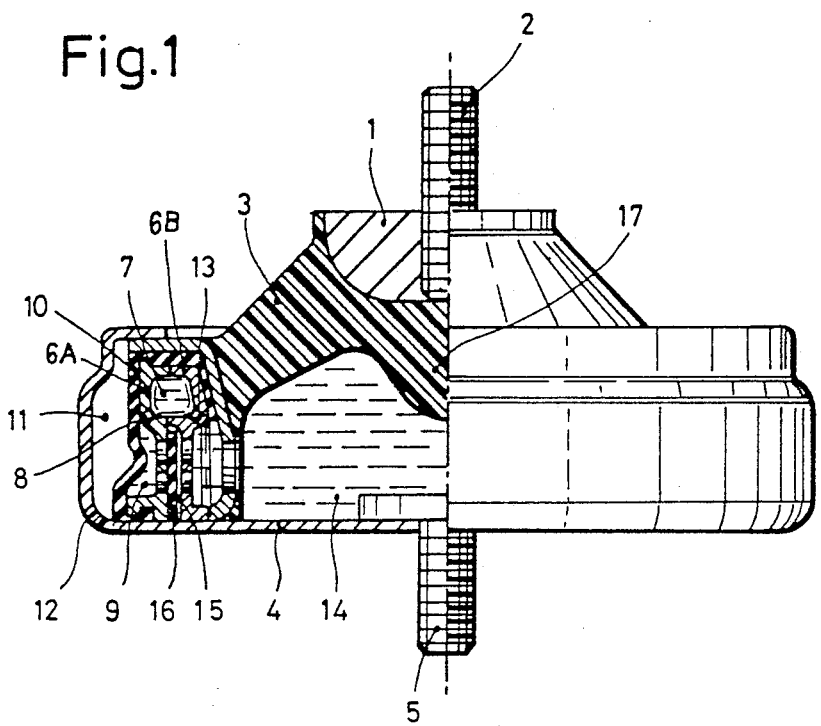
FIG. 1 is a side elevation of a first embodiment according to the invention, with one half of the engine mount illustrated in section.

The engine mount illustrated in FIG. 1 has an upper support member 1 with a coaxial mounting bolt 2. This upper support member 1 is joined through a frusto-conical elastomer element 3 with a lower support member 4 that is also provided with a coaxial bolt 3.

The lower support member 4 has marginal upwardly extending dish-shaped portions and supports on the outer side of the elastomer element 3 two cup-shaped bodies 5, 6 which are sealingly engaged with one another and define an annular passage 7 therebetween. The annular passage 7 communicates via throttle passages 8 with a first hydraulic chamber 9 that is formed on the outside of the cup-shaped body 5 and is bounded on its outer side by a diaphragm 10. The diaphragm 10 is fastened to the cup-shaped member 5 and is adapted for movement into an equalizing chamber 11 that communicates with the atmosphere via a bore 12.

The annular passage 7 also communicates via throttle passages 13 with a large-volume second hydraulic chamber 14 that is formed below the elastomer element 3 and is bounded on the one side by the elastomer element 3 and on the other side by the lower end member 4.

When the engine mount is deflected inwardly, hydraulic damping liquid is caused to flow from the second hydraulic chamber 14 via the throttle passages 13 into the annular passage 7 and from there via throttle passages 8 into the first hydraulic chamber 9. Since the diaphragm 10 is able to freely move into the equalizing chamber 11, the first hydraulic chamber 9 easily accommodates the volume displaced from the second hydraulic chamber 14.

When the engine mount is deflected outwardly, the vacuum created in the inner hydraulic chamber 14 causes damping liquid to be drawn into it from the first hydraulic chamber 9 via the annular passage 7. The damping action realized through this alternating flow action ensures satisfactory damping of the engine mount at large-amplitude excitations which occur under normal driving conditions up to about 20 HZ. The result is that in vehicles equipped with an engine mount according to the invention, the comfort factor is significantly improved.

In order to neutralize acoustic oscillations even further, an annular diaphragm 16 with axial play is provided in the engine mount inside an annular space 15 between the cup-shaped bodies 5, 6. This annular diaphragm 16 is subjected on its inner side to the pressure in the second hydraulic chamber 14 and on its outer side to the pressure in the first hydraulic chamber 9. Depending on the side on which the pressure is highest, the annular diaphragm 16 is caused to move into sealing engagement against the one or other side of the annular chamber 15. For example, upon inward deflection of the engine mount, the annular diaphragm 16 will move into sealing engagement with the outer cup-shaped body 6, whose annular chamber half has a larger diameter than the annular diaphragm 16. This causes the annular diaphragm 16 to be stretched. And this results in a soft engagement to eliminate knocking noise. Thickness and hardness values of the annular diaphragm 16, as well as the amount of diaphragm play, may be established through tests to accommodate the requirements of the specific vehicle type.

Maximum inward deflection is controlled by a stop 17 that is formed on the elastomer element 3 and extends laterally from the upper end member 1 into the second hydraulic chamber 14.

Figure 2:
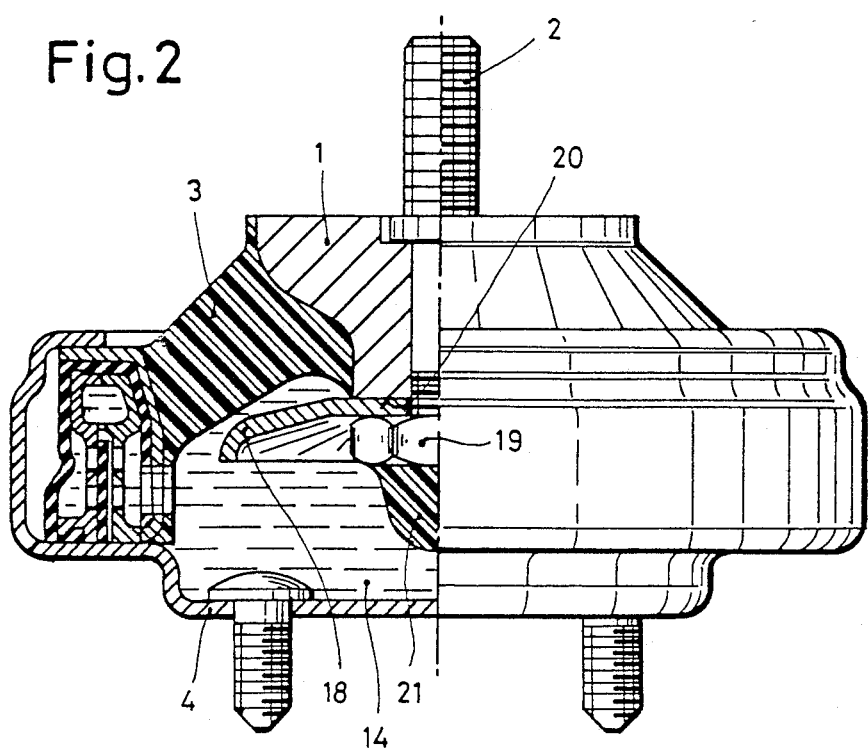
FIG. 2 is a side elevation of a second embodiment according to the invention wherein one half of the engine mount is again shown in section.

The embodiment illustrated in FIG. 2 differs from the one described above primarily in that inside the second hydraulic chamber 14 there is arranged a saucer-shaped disk 18. This disk is fastened by means of a threaded nut 19 against the shoulder 20 of the upper end member 1. The nut 19 is provided with a hat-shaped stop means 21 that is oriented towards the lower end member 4. Upon maximum compression of the engine mount, the stop means 21 engages the lower end portion 4 inside the second hydraulic chamber 14 on the inner side thereof. When the engine mount is pulled apart to its maximum, the disk 18 bears, on the inside of the second hydraulic chamber 14, against the elastomer element 3 from below and thus acts as a pull stop. Furthermore, the disk 18 also functions as an attenuating disk.

The embodiments of the invention in which an exclusive property or privilege is claimed are defined. as follows:

1. A hydraulic engine mount comprising opposed upper and lower support members interconnected only by an elastomer element, and a hydraulic damping device with an annular first hydraulic chamber arranged around the engine mount, with the annular first hydraulic chamber being bounded outwardly by an atmospherically biased elastic diaphragm for volumetric displacement and communicating via throttle passages with a second hydraulic chamber, characterized in that the second hydraulic chamber is located inside the area enclosed by the first hydraulic chamber and is bounded at least on one side by the elastomer element, and in that outside the elastomer element, an annular chamber is provided that communicates via the throttle passages with both hydraulic chambers.

2. The hydraulic engine mount according to claim 1, characterized in that the elastomer element has a frusto-conical configuration.

3. The hydraulic engine mount according to claim 1, characterized in that the annular passage is formed between two sealingly superposed cup-shaped annular bodies which surround the elastomer element and which are provided with throttle passages.

4. The hydraulic engine mount according to claim 1, characterized in that the first hydraulic chamber is positioned on the outside of the outer cup-shaped body, and that the diaphragm is fastened to the cup-shaped body.

5. The hydraulic engine mount according to claim 4, characterized in that the elastic diaphragm forms the boundary between an annular equalizing chamber and the first hydraulic chamber, said equalizing chamber being in communication with the atmosphere and enclosing the first hydraulic chamber.

6. The hydraulic engine mount according to claim 4, characterized in that an annular diaphragm is positioned between the cup-shaped bodies, said annular diaphragm serving on one side thereof as the boundary for the first hydraulic chamber and on the other side for the second hydraulic chamber.

7. The hydraulic engine mount according to claim 6, characterized in that the annular diaphragm is mounted with axial play in an annular chamber between the cup-shaped bodies and is adapted to sealingly engage the one or other cup-shaped body, depending on the biasing direction.

8. The hydraulic engine mount according to claim 6, characterized in that the annular diaphragm is comprised of a number of dissimilar annular segments.

9. The hydraulic engine mount according to claim 7, characterized in that the elastomer element has a stop that is directed inwardly into its dish-shaped area.

10. The hydraulic engine mount according to claim 7, characterized in that the second hydraulic chamber has a dish-shaped disk arranged therein adapted for movement inside the hydraulic chamber into abutment against the elastomer element when the upper and lower support members are pulled apart.

11. The hydraulic engine mount according to claim 10, characterized in that the disk is retained by a threaded nut against a shoulder provided on the side of the respective support member adjacent to the hydraulic chamber, and in that the threaded nut is provided with a stop means on the side nearest the lower end portion.

* * * * *